(12) United States Patent
Kreutzer et al.

(10) Patent No.: US 12,031,613 B2
(45) Date of Patent: Jul. 9, 2024

(54) PROFILED NUT OF A SCREW DRIVE, IN PARTICULAR A BALL SCREW NUT OF A BALL SCREW DRIVE, AND METHOD FOR THE PRODUCTION THEREOF

(71) Applicant: Schaeffler Technologies AG & Co. KG, Herzogenaurach (DE)

(72) Inventors: Mario Kreutzer, Sonneberg (DE); Richard Baier, Aurachtal (DE); Thomas Kandler, Herzogenaurach (DE); Paul Heinz, Forchheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 56 days.

(21) Appl. No.: 17/609,011

(22) PCT Filed: Apr. 22, 2020

(86) PCT No.: PCT/DE2020/100332
§ 371 (c)(1),
(2) Date: Nov. 5, 2021

(87) PCT Pub. No.: WO2020/239164
PCT Pub. Date: Dec. 3, 2020

(65) Prior Publication Data
US 2022/0205519 A1    Jun. 30, 2022

(30) Foreign Application Priority Data
May 28, 2019    (DE) .................... 10 2019 114 276.8

(51) Int. Cl.
*F16H 25/22*    (2006.01)
*F16H 25/24*    (2006.01)
*B21D 53/24*    (2006.01)

(52) U.S. Cl.
CPC ......... *F16H 25/2204* (2013.01); *F16H 25/24* (2013.01); *B21D 53/24* (2013.01); *F16H 2025/2481* (2013.01); *F16H 2025/249* (2013.01)

(58) Field of Classification Search
CPC .............. B21D 53/24; F16H 2025/249; F16H 2025/2481; F16H 25/2204; F16H 25/24
See application file for complete search history.

(56) References Cited

U.S. PATENT DOCUMENTS

| 4,186,621 A | 2/1980 | Brusasco |
| 6,851,330 B2 * | 2/2005 | Buchanan, Jr. ..... F16H 25/2223 74/424.78 |

(Continued)

FOREIGN PATENT DOCUMENTS

| CN | 1533485 A | 9/2004 |
| CN | 2750151 Y | 1/2006 |

(Continued)

OTHER PUBLICATIONS

Engineering Tips, Welding carburized 8620 bushing (commend on Feb. 26, 2011) (Year: 2011).*

(Continued)

*Primary Examiner* — Gregory Robert Weber

(57) ABSTRACT

A profiled nut (1) of a screw drive includes a sleeve (3) produced from sheet steel, has a non-cuttingly formed rolling profile (4) on the inner circumference for rolling contact with rolling bodies and is hardened in a heat treatment method at least in the region of the rolling profile (4). An inner lateral surface of the sleeve (3) having the rolling profile (4) is hardened and has a higher Rockwell hardness. An outer lateral surface of the sleeve (3) is designed such that it can be welded and has a lower Rockwell hardness.

12 Claims, 2 Drawing Sheets

(56) References Cited

U.S. PATENT DOCUMENTS

| | | | |
|---|---|---|---|
| 6,953,627 B2* | 10/2005 | Junius | B22D 11/008 |
| | | | 428/686 |
| 11,326,674 B2* | 5/2022 | Ott | F16H 25/24 |
| 2001/0023618 A1* | 9/2001 | Huppmann | F16H 25/2209 |
| | | | 74/89.42 |
| 2018/0126500 A1* | 5/2018 | Faber | B23P 15/003 |

FOREIGN PATENT DOCUMENTS

| | | |
|---|---|---|
| CN | 107250613 A | 10/2017 |
| DE | 19860643 A1 | 7/2000 |
| DE | 10006536 A1 | 8/2001 |
| DE | 10028968 A1 | 12/2001 |
| DE | 102005006606 B3 | 3/2006 |
| DE | 102016209119 A1 | 11/2017 |
| EP | 0320773 B1 | 1/1994 |
| EP | 1263540 B1 | 6/2004 |
| JP | 2007113611 A * | 5/2007 |
| JP | 2007113611 A | 5/2007 |
| JP | 2015042897 A | 3/2015 |
| JP | 2016080164 A | 5/2016 |
| WO | 2017202412 A1 | 11/2017 |
| WO | 2018091032 A1 | 5/2018 |

OTHER PUBLICATIONS

Manufacturing Review, Investigation of diffusion behavior of carburized sheet metal in hot stamping (Jun. 7, 2019) (Year: 2019).*

* cited by examiner

PROFILED NUT OF A SCREW DRIVE, IN PARTICULAR A BALL SCREW NUT OF A BALL SCREW DRIVE, AND METHOD FOR THE PRODUCTION THEREOF

CROSS-REFERENCE TO RELATED APPLICATIONS

This application is the U.S. National Phase of PCT Appln. No. PCT/DE2020/100332 filed Apr. 22, 2020, which claims priority to DE 10 2019 114 276.8 filed May 28, 2019, the entire disclosures of which are incorporated by reference herein.

TECHNICAL FIELD

The present disclosure relates to a profiled nut of a screw drive, in particular a ball screw nut of a ball screw drive and a method for the production thereof.

BACKGROUND

A ball screw nut of a ball screw drive has been made known from DE2829433 A1, for example. The sleeve of the ball screw nut formed from sheet steel is provided on its inner circumference with a ball groove which is wound helically around the axis of the ball screw drive, and which is rolled in a forming process. The ball screw nut is hardened.

Sheet steels with a low carbon content are suitable for machining without cutting, although they are often unsuitable for hardening in a heat treatment method. For this reason, such sheet steels are carburized and the screw nut formed from them is case-hardened. In many applications, depending on the application, a fixed connection between the screw nut and a weld-on component is required. A welded connection is difficult or impossible due to the high carbon content or the martensitic structure.

SUMMARY

It is desirable to provide a profiled nut of a screw drive which can be produced in a metal forming process and, after hardening, can be connected to a weld-on component in a simple manner.

The profiled nut of a screw drive has a sleeve made of sheet steel, which has a rolling profile formed without cutting on its inner circumference for rolling contact with rolling elements. The sleeve is hardened in a heat treatment method at least in the area of the rolling profile. An inner lateral surface of the sleeve that has the rolling profile is hardened. The rolling profile formed on the inner lateral surface is preferably non-rolling and, after hardening, has a Rockwell hardness between 56 HRC and 64 HRC. This Rockwell hardness is greater than the Rockwell hardness of the outer lateral surface of the sleeve, which is designed to be weldable.

With this nut, on the one hand, the sheet metal can be processed economically by means of forming technology and the nut can be hardened, in particular in the area of the rolling profile; while on the other hand, due to the low carbon content in the area of the weld-on surface of the sleeve, it is possible to later weld a weld-on component to the sleeve or to a flange firmly connected to the sleeve.

For example, the sleeve can only be carburized on the inner lateral surface and hardened in a heat treatment method. Due to the lower carbon content on the outer lateral surface, the sleeve remains weldable. It is conceivable to remove a previously carburized area, provided that this area is to be available as a weld surface. This removal can be carried out before or after the heat treatment.

A particularly preferred variant provides for the use of a sheet steel that is designed as at least two-layer composite material. Such sheet steels can be provided as semi-finished products. A first layer can be formed from an alloyed steel with a higher carbon content forming the inner lateral surface of the sleeve, at any rate with better or higher hardenability. A second layer can be formed from an alloyed steel with a comparatively lower carbon content that forms the outer lateral surface of the sleeve. For the better connection of the two layers, a thin copper layer can be provided as an intermediate layer.

The sleeve can be provided at one axial end with a flange which has a weld surface for welding the weld-on component. This flange is weldable and has a lower Rockwell hardness. This flange can be welded to the non-carburized section of the sleeve or to the second layer of the composite sheet of the sleeve. Advantageously, this flange can also be integrally connected to the sleeve.

The flange can be integrally connected to the second layer of the sleeve made of composite material. The first layer on the flange can be at least partially removed before the heat treatment of the profiled nut in order to enable weldability.

If the above-described carburization is to be carried out, a further development calls for the flange, which is integrally connected to the sleeve, to be provided without carburization at its end facing away from the sleeve before the heat treatment, at least in an area that is to be available as a weld surface.

The profiled nut is preferably designed as a ball screw nut of a ball screw drive, whose ball groove, which is wound helically around a nut axis, is formed by the rolling profile. An embodiment as a planetary roller screw drive with this profiled nut is also useful.

A method for producing a profiled nut provides for the following steps:

The sheet steel is formed into the sleeve in a forming process for example by deep drawing, roller burnishing, and rolling wherein the rolling profile can be molded-on in a rolling process. The sleeve can have an undulating profile when viewed in longitudinal section.

The sleeve is then hardened in a heat treatment method. Before hardening, the outer lateral surface of the sleeve has a sufficiently low carbon content so that its weldability is retained after hardening.

In the case of the multi-layer sheet steel, it is useful to remove the first layer of the sheet steel at least in sections in the area of a weld surface before the heat treatment. This weld surface can be provided on the sleeve, but also on the flange that is integrally connected to the sleeve. The nut prepared in this way is then hardened in a heat treatment method.

In the case of the single-layer sheet steel made from a steel alloy which is good for metal forming, the sheet steel is carburized on one side with subsequent reshaping of the sheet steel to form the sleeve with the integrally formed flange. If a previously carburized end face of the flange is provided as a weld surface due to the shape of the nut, the carburization on the flange is removed to form a weld surface. The nut can then be hardened in a heat treatment method.

BRIEF DESCRIPTION OF THE DRAWINGS

The method and profiled nut is explained in more detail below with reference to exemplary embodiments shown in 3 out of a total of 6 figures. In the figures.

DETAILED DESCRIPTION

In all figures, a profiled nut of a screw drive is shown in the form of a ball screw nut of a ball screw drive.

Figure 1:
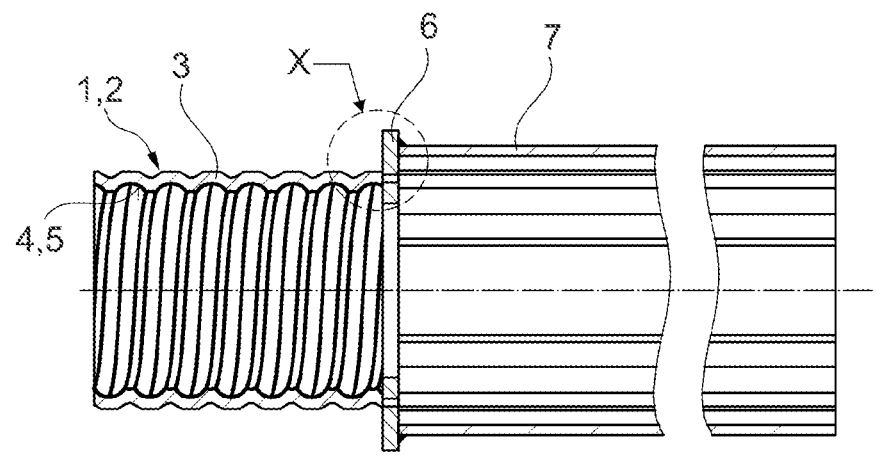
FIG. 1 shows a profiled nut designed as a ball screw nut of a ball screw drive in longitudinal section.

FIG. 1 shows in longitudinal section a profiled nut 1 of a screw drive with weld-on component 7 in longitudinal section. This profiled nut 1 is designed as a ball screw nut 2. The ball screw nut 2 has a sleeve 3 made of sheet steel, on the inner circumference of which a rolling profile 4 formed without cutting is configured for rolling contact with rolling elements, not shown. The rolling profile 4 is designed as a ball groove 5 which is helically wound around a spindle axis and on which rolling elements formed by balls, not shown, can roll.

The sleeve 3 is provided with a flange 6 at one axial end. The weld-on component 7 is welded to the flange 6.

Figure 2:
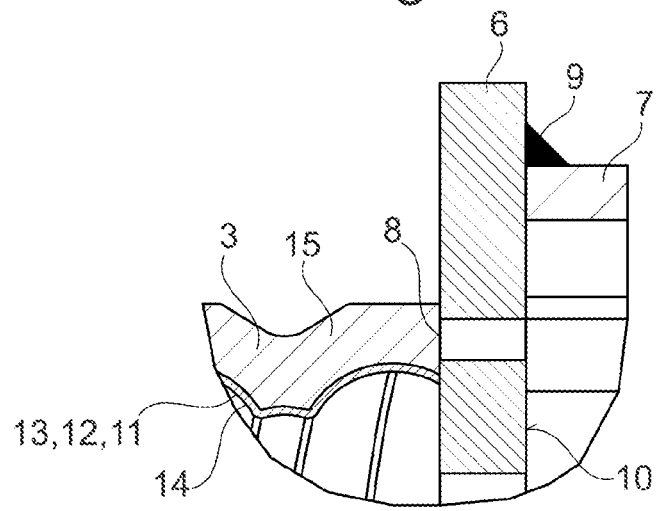
FIG. 2 shows an enlarged detail from FIG. 1.

FIG. 2 is an enlargement of the connection between the sleeve 3 and the weld-on component 7 via the flange 6. It can be clearly seen that the flange 6 is welded to the end face of the sleeve 3 with a weld seam 8, wherein the weld seam 8 penetrates the thickness of the flange 6.

In the exemplary embodiment, the weld-on component 7 is welded to the end face 10 of the flange 6 facing away from the sleeve 3 by means of a fillet weld 9.

Figure 3:
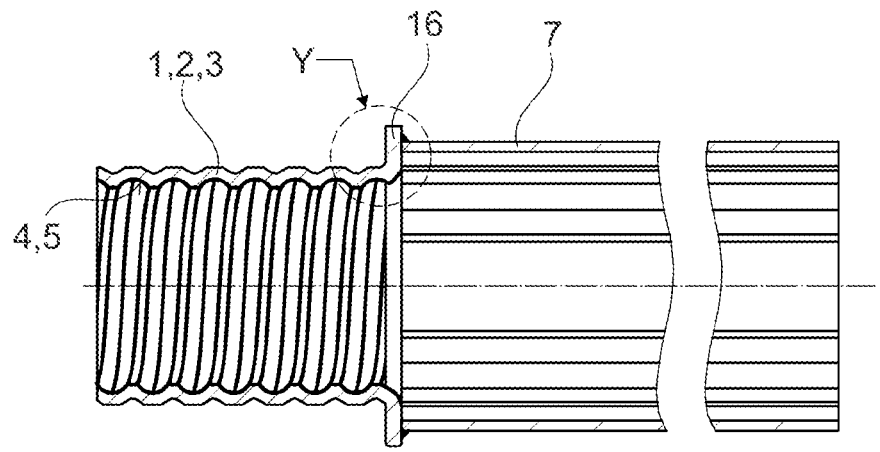
FIG. 3 shows another ball screw nut in longitudinal section.
Figure 4:
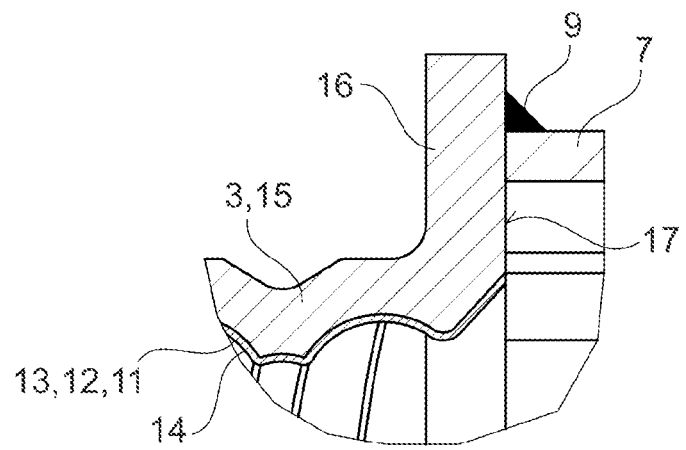
FIG. 4 shows a detail from FIG. 3.

The exemplary embodiment according to FIGS. 3 and 4 differs from that of FIGS. 1 and 2 only in that a flange 16 is formed which is integrally connected to the sleeve 3, and to whose end face 17 facing the weld-on component 7 the weld-on component 7 is welded.

Figure 5:
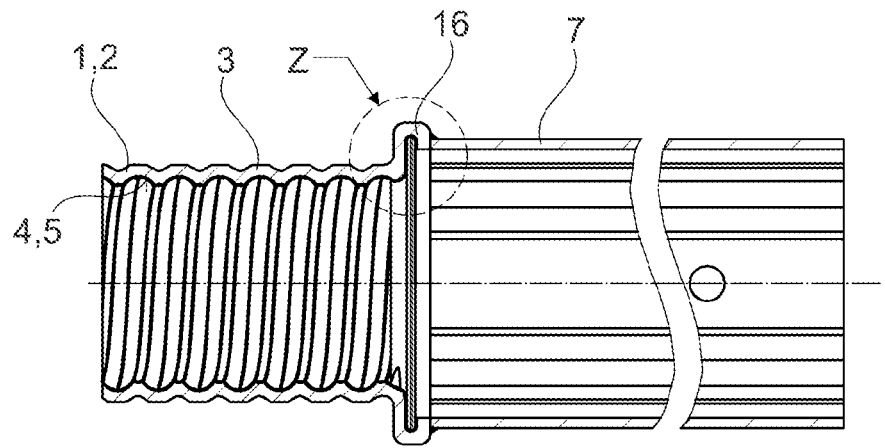
FIG. 5 shows another ball screw nut in longitudinal section.
Figure 6:
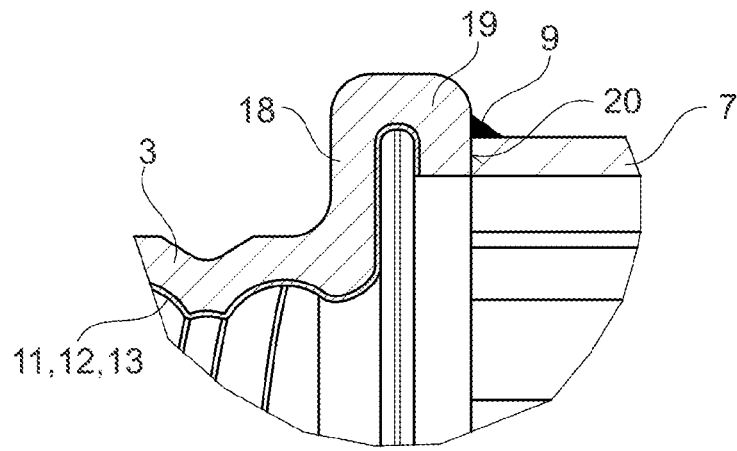
FIG. 6 shows an enlarged detail from FIG. 5.

The embodiment according to FIGS. 5 and 6 differs from that of FIGS. 3 and 4 only in that a flange 18 is integrally formed with the sleeve 3, the free end of which is provided with a flanging 19 so that the outer lateral surface of the sleeve 3 forms an end face 20 which faces the weld-on component 7 and is welded to the weld-on component 7.

In all of the exemplary embodiments, on its inner lateral surface the sleeve 3 is provided with a hardened layer 11, which in the figures is based on two different structures of the sheet steel as an alternative.

Alternative 1: This hardened layer 11 can be formed by carburization 12 of the sheet steel with subsequent heat treatment. The carburization 12 on the inner lateral surface of the sleeve 3 can be clearly seen in all the exemplary embodiments. In this case the sleeve 3 is case hardened. The sleeve 3 made from this sheet metal is non-rolling on its inner lateral surface after hardening.

Alternative 2: This hardened layer 11 can also be provided by a sheet steel that is designed as a two-layer composite material 13. The two-layer composite material 13 can be clearly seen in all exemplary embodiments. A first layer 14 of this composite material 13 is formed from an alloyed steel which has a higher carbon content and forms the inner lateral surface of the sleeve 3. A second layer 15 is formed from an alloyed steel which forms the outer lateral surface of the sleeve 3 and has a comparatively lower carbon content, which is characterized by better weldability. The sleeve 3 made from this composite sheet is non-rolling on its inner lateral surface after hardening.

In all of the exemplary embodiments, the weld-on component 7 is welded to a weldable surface either on the sleeve 3 or on the flange 6, 16, 18 firmly connected to the sleeve 3.

1 Nut
2 Ball screw nut
3 Sleeve
4 Rolling profile
5 Ball groove
6 Flange
7 Weld-on component
8 Weld seam
9 Fillet weld
10 End face
11 Hardened layer
12 Carburization
13 Composite material
14 First layer
15 Second layer
16 Flange
17 End face
18 Flange
19 Flanging
20 End face

The invention claimed is:

1. A profiled nut of a screw drive, a sleeve of which, produced from a multi-layer composite sheet steel, has a non-cuttingly formed rolling profile on its inner circumference for rolling contact with rolling bodies and is hardened in a heat treatment method at least in a region of the rolling profile, wherein an inner lateral surface of the sleeve having the rolling profile is hardened and has a first Rockwell hardness, and an outer lateral surface of the sleeve is configured such that it can be welded and has a second Rockwell hardness lower than the first Rockwell hardness, and wherein the multi-layer composite sheet steel includes: i) a first layer comprising an alloyed steel forming the inner lateral surface of the sleeve and having a first carbon content, and ii) a second layer forming the outer lateral surface comprising an alloyed steel having a second carbon content lower than the first carbon content.

2. The profiled nut according to claim 1, wherein the sleeve is carburized on only the inner lateral surface and then hardened in the heat treatment method.

3. The profiled nut according to claim 1, wherein the sleeve is provided at one axial end with a flange, which is weldable and has a lower Rockwell hardness than the first Rockwell hardness.

4. The profiled nut according to claim 3, wherein the sleeve is carburized on only the inner lateral surface and then hardened in the heat treatment method, and the flange is integrally connected to the sleeve and is free of carburization at its end facing away from the sleeve.

5. The profiled nut according to claim 1, wherein the sleeve is provided at one axial end with a flange integrally connected to the second layer of the multi-layer composite sheet steel.

6. The profiled nut according to claim 1, configured as a ball screw nut of a ball screw drive, the ball screw nut having a ball groove helically wound around a nut axis formed by the rolling profile.

7. A method for producing a profiled nut according to claim 1, wherein the multi-layer composite sheet steel is formed into the sleeve in a forming process and then hardened in a heat treatment method.

8. The method according to claim 7 for producing a profiled nut, comprising:
- forming the multi-layer composite sheet steel into the sleeve with an integrally formed flange;
- at least in sections, removing the first layer of the multi-layer composite sheet steel on the integrally formed flange on a side provided as a weld surface for a weld-on component; and
- hardening the profiled nut in the heat treatment method.

9. The method according to claim 7 for producing a profiled nut, comprising:
- carburizing one side of the multi-layer composite sheet steel;
- forming the multi-layer composite sheet steel to form the sleeve with an integrally formed flange; and
- hardening the profiled nut in the heat treatment method.

10. The method according to claim 9 for producing a profiled nut, further comprising:
- removing the carburization on the integrally formed flange to form a weld surface.

11. The profiled nut according to claim 1, wherein the sleeve has an undulating profile when viewed in longitudinal section.

12. The profiled nut according to claim 1, wherein the multi-layer composite sheet steel includes a copper layer arranged between the first layer and the second layer.

* * * * *